(12) United States Patent
Nakajima

(10) Patent No.: US 9,315,657 B2
(45) Date of Patent: Apr. 19, 2016

(54) PROPYLENE RESIN COMPOSITION

(71) Applicant: Sumitomo Chemical Company, Limited, Tokyo (JP)

(72) Inventor: Hiroyoshi Nakajima, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 105 days.

(21) Appl. No.: 14/325,849

(22) Filed: Jul. 8, 2014

(65) Prior Publication Data

US 2015/0018474 A1  Jan. 15, 2015

(30) Foreign Application Priority Data

Jul. 12, 2013 (JP) ................. 2013-146102

(51) Int. Cl.
  *C08K 5/01* (2006.01)
  *C08L 23/14* (2006.01)
  *C08L 23/12* (2006.01)

(52) U.S. Cl.
  CPC ............. *C08L 23/14* (2013.01); *C08L 23/12* (2013.01); *C08L 2205/025* (2013.01); *C08L 2205/035* (2013.01)

(58) Field of Classification Search
  USPC ........................................ 524/477
  See application file for complete search history.

(56) References Cited

U.S. PATENT DOCUMENTS 6,251,997 B1  6/2001  Imai et al.
6,306,973 B1  10/2001  Takaoka et al.

FOREIGN PATENT DOCUMENTS

JP    2003-327758 A    11/2003

OTHER PUBLICATIONS

Machine translation JP 2003-327758, 2003.*

* cited by examiner

*Primary Examiner* — Wenwen Cai
(74) *Attorney, Agent, or Firm* — Panitch Schwarze Belisario & Nadel LLP

(57) ABSTRACT

Disclosed are a propylene resin composition (A) composed of 0.5 to 10% by weight of a specific propylene homopolymer (a1), 40 to 98% by weight of a specific propylene polymer (a2), 1 to 25% by weight of a specific propylene-ethylene random copolymer (a3), and 0.5 to 25% by weight of a specific propylene-ethylene random copolymer (a4), where the total amount of (a1), (a2), (a3) and (a4) is taken as 100% by weight, and an olefin resin composition comprising 100 parts by weight of the propylene resin composition (A), 5 to 75 parts by weight of an ethylene-α-olefin copolymer (B), and 1 to 75 parts by weight of an inorganic filler (C). The propylene resin composition can afford a molded article excellent in scratch resistance and rigidity.

2 Claims, No Drawings

PROPYLENE RESIN COMPOSITION

BACKGROUND OF THE INVENTION

1. Field of the Invention

The present invention relates to propylene resin compositions. Particularly, the invention relates to a propylene resin composition from which a molded article excellent in scratch resistance and rigidity can be afforded.

2. Description of the Related Art

Polypropylene resin compositions have heretofore been used in the form of molded articles such as automobile interior or exterior parts and electric parts.

For example, JP-A-2003-327758 discloses a polypropylene-based resin composition composed of a propylene-based polymer component (A) having an intrinsic viscosity of 5 dl/g or more and a melting peak temperature of 130 to 160° C., a propylene polymer component (B) having an intrinsic viscosity of 1.5 dl/g or less, a propylene-ethylene random copolymer component (C) having an intrinsic viscosity of 8 dl/g or less and an ethylene content of not less than 20% by weight but less than 50% by weight, and a propylene-ethylene random copolymer component (D) having an intrinsic viscosity of 8 dl/g or less and an ethylene content of 50 to 90% by weight, the composition having been developed for improving appearance and balance between physical properties of a molded article.

JP-A-2000-290333 discloses a polypropylene block copolymer resin comprising (A) a high molecular weight polypropylene portion having an intrinsic viscosity of 6 to 13 dl/g, (B) a low molecular weight polypropylene portion having an intrinsic viscosity of less than 6 dl/g, and (C) an ethylene α-olefin copolymer portion having an intrinsic viscosity of 0.1 to 13 dl/g, wherein the components of the copolymer fractionated with a paraxylene solvent and the contents of the components are specific components and specific contents and the copolymer has a specific melt flow rate and a specific molecular weight distribution, the resin having been developed for improving the moldability of resin and balance between physical properties of a molded article.

The propylene resin compositions disclosed in the above-cited publications, however, are unsatisfactory in scratch resistance and rigidity. Thus, the object of the present invention is to provide a propylene resin composition from which a molded article excellent in scratch resistance and rigidity can be afforded.

SUMMARY OF THE INVENTION

In one aspect the present invention relates to a propylene resin composition (A) composed of 0.5 to 10% by weight of a propylene homopolymer (a1) defined below, 40 to 98% by weight of a propylene polymer (a2) defined below, 1 to 25% by weight of a propylene-ethylene random copolymer (a3) defined below, and 0.5 to 25% by weight of a propylene-ethylene random copolymer (a4) defined below, where the total amount of (a1), (a2), (a3) and (a4) is taken as 100% by weight, propylene homopolymer (a1):

a propylene homopolymer whose intrinsic viscosity $[\eta]_{a1}$ is 5 dl/g or more and whose melting peak temperature exhibited in a melting curve measured by using a differential scanning calorimeter is a temperature higher than 160° C., propylene polymer (a2):

a propylene homopolymer whose intrinsic viscosity $[\eta]_{a2}$ is less than 5 dl/g, or a propylene random copolymer which is composed of constitutional units derived from at least one comonomer selected from the group consisting of ethylene and α-olefins having 4 to 10 carbon atoms and constitutional units derived from propylene, wherein the content of the constitutional units derived from at least one comonomer selected from the group consisting of ethylene and α-olefins having 4 to 10 carbon atoms is not less than 0.01% by weight but less than 20% by weight, and the intrinsic viscosity $[\eta]_{a2}$ of which is less than 5 dl/g, propylene-ethylene random copolymer (a3):

a propylene-ethylene random copolymer whose intrinsic viscosity $[\eta]_{a3}$ is 2 to 5 dl/g and whose content of constitutional units derived from ethylene is 25 to 35% by weight where the weight of the entire propylene-ethylene random copolymer (a3) is taken as 100% by weight, propylene-ethylene random copolymer (a4):

a propylene-ethylene random copolymer whose intrinsic viscosity $[\eta]_{a4}$ is more than 5 dl/g but not more than 8 dl/g and whose content of constitutional units derived from ethylene is 40 to 90% by weight where the weight of the entire propylene-ethylene random copolymer (a4) is taken as 100% by weight.

In another aspect, the present invention relates to an olefin resin composition comprising 100 parts by weight of the propylene resin composition (A), 5 to 75 parts by weight of an ethylene-α-olefin copolymer (B), and 1 to 75 parts by weight of an inorganic filler (C).

According to the present invention, it is possible to provide a propylene resin composition from which a molded article excellent in scratch resistance and rigidity can be obtained and also possible to obtain a molded article excellent in scratch resistance and rigidity.

DETAILED DESCRIPTION OF THE PREFERRED EMBODIMENTS

Each of the components to be used for the propylene resin composition (A) is described below.

<Propylene Homopolymer (a1)>

The propylene homopolymer (a1) (hereinafter called homopolymer (a1)) to be used for the resin composition (A) is a polymer composed of structural units derived from propylene.

The intrinsic viscosity $[\eta]_{a1}$ of the homopolymer (a1) measured in tetralin at 135° C. is 5 dl/g or more, preferably 6 dl/g or more, and more preferably 7 to 9 dl/g. Adjusting the $[\eta]_{a1}$ to 5 dl/g or more can make the scratch resistance and the rigidity of a molded article sufficiently high.

The intrinsic viscosity [η] (unit: dl/g) in the present invention is a value measured by the method described below at a temperature of 135° C. using tetralin as a solvent.

A reduced viscosity is measured at three concentrations 0.1 g/dl, 0.2 g/dl and 0.5 g/dl with an Ubbelohde's viscometer. The intrinsic viscosity is calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated to zero.

The melting peak temperature $Tm_{(a1)}$ of a melting curve of the homopolymer (a1) measured using a differential scanning calorimeter is higher than 160° C. Adjusting $Tm_{(a1)}$ to higher than 160° C. can make the scratch resistance and the rigidity of a molded article sufficiently high.

<Propylene Polymer (a2)>

The propylene homopolymer (a2) (hereinafter called polymer (a2)) to be used for the resin composition (A) is a propylene homopolymer or a propylene random copolymer.

When the polymer (a2) is a propylene homopolymer, the polymer (a2) is a polymer composed of structural units derived from propylene.

The intrinsic viscosity $[\eta]_{a2}$ of the propylene homopolymer is less than 5 dl/g, preferably not less than 0.7 dl/g but less than 5 dl/g, and more preferably 0.7 to 3 dl/g. Adjusting the intrinsic viscosity $[\eta]_{a2}$ to less than 5 dl/g can make the scratch resistance and the rigidity of a molded article sufficiently high and can suppress decrease in flowability when forming a molded article and defective molding when forming a molded article.

When the polymer (a2) is a propylene random copolymer, the polymer (a2) is particularly a propylene random copolymer composed of constitutional units derived from at least one comonomer selected from the group consisting of ethylene and α-olefins having 4 to 10 carbon atoms and constitutional units derived from propylene.

The content of the constitutional units derived from the at least one comonomer selected from the group consisting of ethylene and α-olefins having 4 to 10 carbon atoms is not less than 0.01% by weight but less than 20% by weight, where the overall amount of the propylene polymer (a2) is taken as 100% by weight. Adjusting the content of the constitutional units to not less than 0.01% by weight but less than 20% by eight can snake the scratch resistance and the rigidity of a molded article sufficiently high.

The intrinsic viscosity $[\eta]_{a2}$ of the propylene random polymer is less than 5 dl/g, preferably not less than 0.7 dl/g but less than 5 dl/g, and more preferably 0.7 to 3 dl/g. Adjusting the intrinsic viscosity $[\eta]_{a2}$ to less than 5 dl/g can make the scratch resistance and the rigidity of a molded article sufficiently high and can suppress decrease in flowability when forming a molded article and defective molding when forming a molded article.

1-Butene, 1-hexene, and 1-octene are preferred as the α-olefin having from 4 to 10 carbon atoms and 1-butene is more preferred.

The isotactic pentad fraction (hereinafter called [mmmm]) of the polymer (a2) is preferably 0.97 or more, more preferably 0.98 or more in terms of good balance between the rigidity and the toughness of the resin composition (A).

The [mmmm] is a value measured with $^{13}$C-NMR and it is an index showing the degree of regioregularity or the degree of crystallinity of the polymer (a2); the closer to 1 the [mmmm] of the polymer (a2), the higher the regioregularity of the molecular structure of the polymer (a2) and the higher the crystallinity of the polymer (a2).

When the polymer (a2) is a propylene random copolymer, a value measured for chains of structural units derived from propylene contained in the copolymer is used as the [mmmm] of the polymer (a2).

<Propylene-Ethylene Random Copolymer (a3)>

The propylene-ethylene random copolymer (a3) (hereinafter called copolymer (a3)) to be used for the resin composition (A) is a propylene-ethylene random copolymer composed of constitutional units derived from propylene and constitutional units derived from ethylene.

The intrinsic viscosity $[\eta]_{a3}$ of the copolymer (a3) is 2 to 5 dl/g, preferably 2 to 4 dl/g or less. Adjusting the intrinsic viscosity $[\eta]_{a3}$ to 2 to 5 dl/g can make scratch resistance and rigidity of a molded article sufficiently high.

The content of the constitutional units derived from ethylene is 25 to 35% by weight where the overall weight of the propylene-ethylene random copolymer (a3) is taken as 100% by weight. Adjusting the content of the constitutional units derived from ethylene to 25 to 35% by weight can make the scratch resistance and the rigidity of a molded article sufficiently high.

<Propylene-Ethylene Random Copolymer (a4)>

The propylene-ethylene random copolymer (a4) (hereinafter called copolymer (a4)) to be used for the resin composition (A) is a propylene-ethylene random copolymer composed of constitutional units derived propylene and constitutional units derived from ethylene.

The content of the constitutional units derived from ethylene is 40 to 90% by weight, preferably 40 to 60% by weight where the overall weight of the propylene-ethylene random copolymer (a4) is taken as 100% by weight. Adjusting the content of the constitutional units derived from ethylene to 40 to 90% by weight can make the scratch resistance and the rigidity of a molded article sufficiently high and can ensure good balance between the hardness and the low-temperature impact resistance of a molded article.

The intrinsic viscosity $[\eta]_{a4}$ of the copolymer (a4) is more than 5 but not more than 8 dl/g, preferably more than 5 dl/g but not more than 7 dl/g. Adjusting the intrinsic viscosity $[\eta]_{a4}$ to more than 5 but not more than 8 dl/g can make the scratch resistance and the rigidity of a molded article sufficiently high.

<Method for Producing Polymer>

The homopolymer (a1) is produced by homopolymerizing propylene using a polymerization catalyst.

The polymer (a2) is produced by homopolymerizing propylene using a polymerization catalyst when the polymer (a2) is a propylene homopolymer. In the case of a propylene random copolymer, the polymer (a2) is produced by copolymerizing propylene and at least one comonomer selected from the group consisting of ethylene and α-olefins having 4 to 10 carbon atoms.

The copolymer (a3) is produced by copolymerizing propylene and ethylene using a polymerization catalyst, and the copolymer (a4) is also produced by copolymerizing propylene and ethylene using a polymerization catalyst.

<Polymerization Catalyst>

Examples of the polymerization catalyst include:

(1) a catalyst system composed of (1-i) a solid catalyst component comprising magnesium, titanium, halogen and an electron donor as essential components, (1-ii) an organoaluminum compound, and (1-iii) an electron donor component, (2) a catalyst system composed of (2-i) a compound of a transition metal of Group 4 of the periodic table, the compound having a cyclopentadienyl ring, and (2-ii) an alkyl aluminoxane, (3) a catalyst system composed of (3-i) a compound of a transition metal of Group 4 of the periodic table, the compound having a cyclopentadienyl ring, (3-ii) a compound capable of reacting with the foregoing compound to form an ionic complex, and (3-iii) an organoaluminum compound, and (4) a catalyst system prepared by supporting a catalyst component comprising (4-i) a compound of a transition metal of Group 4 of the periodic table, the compound having a cyclopentadienyl ring, (4-ii) a compound capable of forming an ionic complex, and (4-iii) an organoaluminum compound on inorganic particles, such as silica and clay minerals, followed by modification.

Moreover, a preliminarily polymerized catalyst prepared by preliminarily polymerizing ethylene, propylene or an α-olefin in the presence of an aforementioned catalyst system also may be used.

Specific examples of the catalyst systems include the catalyst systems disclosed in JP 61-218606 A, JP 5-194685 A, JP 7-216017 A, JP 9-316147 A, JP 10-212319 A, and JP 2004-182981 A.

<Polymerization Method>

Examples of the polymerization method include bulk polymerization, solution polymerization, slurry polymerization, and gas phase polymerization. The bulk polymerization is a method in which polymerization is carried out using, as a medium, an olefin that is liquid at the polymerization temperature, and the solution polymerization or the slurry polymerization is a method in which polymerization is carried out in an inert hydrocarbon solvent such as propane, butane, isobutane, pentane, hexane, heptane, and octane.

The gas phase polymerization is a method in which a gaseous monomer is used as a medium and a gaseous monomer is polymerized in the medium.

These polymerization methods may be either of a batch type or a continuous type. Such polymerization methods may be conducted either in a single stage type using a single polymerization reactor or in a multistage system using a plurality of polymerization reactors linked in series, and these polymerization methods may be combined appropriately. A continuous gas phase polymerization method or a bulk-gas phase polymerization method in which a bulk polymerization method and a gas phase polymerization method are carried out successively is preferred because they are advantageous for mass production and are economical.

Conditions (polymerization temperature, polymerization pressure, monomer concentration, catalyst charge, polymerization time, etc.) used in the polymerization step can be determined appropriately according to the catalyst species and the intrinsic viscosity of the homopolymer (a1), the polymer (a2), the copolymer (a3), or the copolymer (a4) to be produced, the content and the comonomer species of each component, etc.

In the production of the homopolymer (a1), the polymer (a2), the copolymer (a3), or the copolymer (a4), it is permitted to heat the polymer or copolymer at a temperature not higher than the temperature at which the polymer or copolymer melts in order to remove residual solvent contained in the polymer or copolymer or remove oligomers byproduced during the production. Examples of the method of removing the residual solvent and the oligomers include the methods disclosed in JP-A-55-75410 and Japanese Patent No. 2565753.

[Propylene Resin Composition (A)]

The propylene resin composition (A) of the present invention is a propylene resin composition composed of 0.5 to 10% by weight of a propylene homopolymer (a1), 40 to 98% by weight of a propylene polymer (a2), 1 to 25% by weight of a propylene-ethylene random copolymer (a3), and 0.5 to 25% by weight of a propylene-ethylene random copolymer (a4), where the total amount of the homopolymer (a1), the polymer (a2), the copolymer (a3) and the copolymer (a4) is taken as 100% by weight.

The content of the homopolymer (a1) is preferably 1 to 8% by weight, more preferably 1 to 4% by weight.

The content of the polymer (a2) is preferably 40 to 85% by weight, more preferably 50 to 80% by weight.

The content of the copolymer (a3) is preferably 10 to 25% by weight, more preferably 14 to 20% by weight.

The content of the copolymer (a4) is preferably 1 to 15% by weight, more preferably 5 to 10% by weight.

[Method for Producing of Propylene Resin Composition (A)]

The method for producing the propylene resin composition (A) of the present invention may be a method comprising producing the homopolymer (a1), the polymer (a2), the copolymer (a3), and the copolymer (a4) separately using the above-mentioned polymerization catalyst and melt-kneading the homopolymer (a1), the polymer (a2), the copolymer (a3) and the copolymer (a4) produced separately.

Examples of the method of the melt-knead include:

(1-a) a method comprising melt-kneading the homopolymer (a1), the polymer (a2), the copolymer (a3), and the copolymer (a4) at once, (1-b) a method comprising melt-kneading the homopolymer (a1), the polymer (a2), the copolymer (a3), and the copolymer (a4) sequentially in, arbitrary order, (1-c) a method comprising melt-kneading two species arbitrarily selected from among the homopolymer (a1), the polymer (a2), the copolymer (a3), and the copolymer (a4) beforehand and further melt-kneading the other two species with the material melt-kneaded beforehand, and (1-d) a method comprising melt-kneading three species arbitrarily selected from among the homopolymer (a1), the polymer (a2), the copolymer (a3), and the copolymer (a4) beforehand and further melt-kneading the other one with the material melt-kneaded beforehand.

Examples of the method for producing the propylene resin composition (A) of the present invention include:

(2-a) a method comprising producing a polymeric material comprising two species arbitrarily selected from among the homopolymer (a1), the polymer (a2), the copolymer (a3), and the copolymer (a4) by a continuous multistage polymerization method using the above-mentioned polymerization catalyst and melt-kneading the polymeric material with the other two species, (2-b) a method comprising producing a polymeric material comprising three species arbitrarily selected from among the homopolymer (a1), the polymer (a2), the copolymer (a3), and the copolymer (a4) by a continuous multistage polymerization method using the above-mentioned polymerization catalyst and melt-kneading the polymeric material with the other one, and (2-c) a method comprising producing a polymeric material comprising all of the homopolymer (a1), the polymer (a2), the copolymer (a3), and the copolymer (a4) by a continuous multistage polymerization method using the above-mentioned polymerization catalyst and melt-kneading the polymeric material with another one.

Examples of the above-mentioned production method (2-a) include:

(2-a1) a method in which using the above-mentioned polymerization catalyst in an apparatus comprising two polymerization vessels arranged in series, a homopolymer (a1) is produced in a first polymerization vessel, the homopolymer (a1) obtained in the first polymerization vessel is transferred to a second polymerization vessel, a polymer (a2) is produced in the second polymerization vessel, thereby producing a polymeric material (a1-a2) comprising the homopolymer (a1) and the polymer (a2), and the polymeric material (a1-a2) is melt-kneaded with a copolymer (a3) and a copolymer (a4), and (2-a2) a method in which using the above-mentioned polymerization catalyst in an apparatus comprising two polymerization vessels arranged in series, a homopolymer (a1) is produced in a first polymerization vessel, the homopolymer (a1) obtained in the first polymerization vessel is transferred to a second polymerization vessel, a copolymer (a3) is produced in the second polymerization vessel, thereby producing a polymeric material (a1-a3) comprising the homopolymer (a1) and the copolymer (a3), and the polymeric material (a1-a3) is melt-kneaded with a polymer (a2) and a copolymer (a4).

Examples of the above-mentioned production method (2-1)) include:

(2-b1) a method in which using the above-mentioned polymerization catalyst in an apparatus comprising three polymerization vessels arranged in series, a homopolymer (a1) is produced in a first polymerization vessel, the homopolymer (a1) obtained in the first polymerization vessel is transferred to a second polymerization vessel, a polymer (a2) is, produced in the second polymerization vessel, the mixture of the homopolymer (a1) and the polymer (a2) obtained in the second polymerization vessel is transferred to a third polymerization vessel, a copolymer (a3) is produced in the third polymerization vessel, thereby producing a polymeric material (a1-a2-a3) comprising the homopolymer (a1), the polymer (a2) and the copolymer (a3), and the polymeric material (a1-a2-a3) is melt-kneaded with a copolymer (a4), (2-b2) a method in which using the above-mentioned polymerization catalyst in an apparatus comprising three polymerization vessels arranged in series, a homopolymer (a1) is produced in a first polymerization vessel, the homopolymer (a1) obtained in the first polymerization vessel is transferred to a second polymerization vessel, a polymer (a2) is produced in the second polymerization vessel, the mixture of the homopolymer (a1) and the polymer (a2) obtained in the second polymerization vessel is transferred to a third polymerization vessel, a copolymer (a4) is produced in the third polymerization vessel, thereby producing a polymeric material (a1-a2-a4) comp (a1), the polymer (a2) and the copolymer (a4), and the polymeric material (a1-a2-a4 melt-kneaded with a copolymer (a3), and (2-b3) a method in which using the above-mentioned polymerization catalyst in an apparatus comprising three polymerization vessels arranged in series, a homopolymer (a1) is produced in a first polymerization vessel, the homopolymer (a1) obtained in the first polymerization vessel is transferred to a second polymerization vessel, a copolymer (a3) is produced in the second polymerization vessel, the mixture of the homopolymer (a1) and the copolymer (a3) obtained in the second polymerization vessel is transferred to a third polymerization vessel, a copolymer (a4) is produced in the third polymerization vessel, thereby producing a polymeric material (a1-a3-a4) comprising the homopolymer (a1), the copolymer (a3) and the copolymer (a4), and the polymeric material (a1-a3-a4) is melt-kneaded with a polymer (a2).

The above-mentioned production method (2-c) may be a method in which using the above-mentioned polymerization catalyst in an apparatus comprising four polymerization vessels arranged in series, a homopolymer (a1) is produced in a first polymerization vessel, the homopolymer (a1) obtained in the first polymerization vessel is transferred to a second polymerization vessel, a polymer (a2) is produced in the second polymerization vessel, the mixture of the homopolymer (a1) and the polymer (a2) obtained in the second polymerization vessel is transferred to a third polymerization vessel, a copolymer (a3) is produced in the third polymerization vessel, the mixture of the homopolymer (a1), the polymer (a2) and the copolymer (a3) obtained in the third polymerization vessel is transferred to a fourth polymerization vessel, and a copolymer (a4) is produced in the fourth polymerization vessel, thereby producing a polymeric material (a1-a2-a3-a4) comprising the homopolymer (a1), the polymer (a2), the copolymer (a3) and the copolymer (a4).

<Olefin Resin Composition>

The olefin resin composition of the present invention is an olefin resin composition comprising a propylene resin composition (A), an ethylene-$\alpha$-olefin copolymer (B), and an inorganic filler (C). Descriptions are made to the ethylene-$\alpha$-olefin copolymer (B) and the inorganic filler (C) below.

[Ethylene-$\alpha$-Olefin Copolymer (B)]

The ethylene-$\alpha$-olefin copolymer (B) to be used for the olefin resin composition of the present invention is a copolymer comprising structural units derived from ethylene and structural units derived from at least one $\alpha$-olefin selected from among $\alpha$-olefins having 4 to 10 carbon atoms.

Specific examples of the $\alpha$-olefin having 4 to 10 carbon atoms to be used for the ethylene-$\alpha$-olefin copolymer (B) include 1-butene, 1-pentene, 1-hexene, 4-methyl-1-pentene, 1-octene, and 1-decene, and $\alpha$-olefins having a cyclic structure, and 1-butene, 1-hexene and 1-octene are preferred.

The content of the structural units derived from at least one $\alpha$-olefin selected from $\alpha$-olefins having 4 to 10 carbon atoms contained in the ethylene-$\alpha$-olefin copolymer (B) is preferably 1 to 49% by weight, more preferably 1 to 30% by weight, even more preferably 1 to 20% by weight where the overall weight of the ethylene-$\alpha$-olefin copolymer (B) is taken as 100% by weight.

Specific examples of the ethylene-$\alpha$-olefin copolymer (B) include ethylene-1-butene copolymers, ethylene-1-hexene copolymers, ethylene-1-octene copolymers, ethylene-1-decene copolymers, ethylene-(3-methyl-1-butene) copolymers, and copolymers of ethylene and an $\alpha$-olefin having a cyclic structure.

The melt flow rate of the ethylene-$\alpha$-olefin copolymer (B) is preferably 0.1 to 50 g/10 min. The melt flow rate is measured at 190° C. and a 2.16 kgf load in accordance with JIS K7210.

The density of the ethylene-$\alpha$-olefin copolymer (B) is preferably 0.85 to 0.89 g/cm$^3$, more preferably 0.85 to 0.88 g/cm$^3$, and even more preferably 0.855 to 0.875 g/cm$^3$ in terms of the impact resistance of a molded article.

The ethylene-$\alpha$-olefin copolymer (B) can be produced using a polymerization catalyst.

Examples of the polymerization catalyst include homogeneous catalyst systems typified by metallocene catalyst systems, and Ziegler-Natta type catalyst systems.

Examples of the homogeneous catalyst systems include:
(i) catalyst systems composed of an alkyl aluminoxane and a compound of a transition metal of Group 4 of the periodic table, the compound having a cyclopentadienyl ring,
(ii) catalyst systems composed of an organoaluminum compound, a compound of a transition metal of Group 4 of the periodic table, the compound having a cyclopentadienyl ring, and a compound capable of reacting with the foregoing compound to form an ionic complex, and
(iii) catalyst systems prepared by supporting a catalyst component comprising a compound of a transition metal compound of Group 4 of the periodic table having a cyclopentadienyl ring, a compound capable of reacting with the foregoing compound to form an ionic complex, and an organoaluminum compound on inorganic particles, such as silica and clay minerals, followed by modification.

Examples of the Ziegler-Natta type catalyst systems include a catalyst system comprising a combination of a titanium-containing solid component and an organic metal component.

Another example is a prepolymerized catalyst prepared by prepolymerizing ethylene, propylene, or an $\alpha$-olefin having 4 to 10 carbon atoms in the presence of the above-mentioned catalyst system.

The ethylene-$\alpha$-olefin copolymer (B) may be a commercially available product. Examples of the commercially available ethylene-$\alpha$-olefin copolymer (B) include ENGAGE (registered trademark) produced by Dow Chemical Japan, Ltd., TAFMER (registered trademark) produced by Mitsui Chemicals, Inc., NEO-ZEX (registered trademark) and ULTZEX (registered trademark) produced by Prime Polymer Co., Ltd., and EXCELLEN (registered trademark) FX, SUMIKATHENE (registered trademark), and ESPLENE (registered trademark) SPO produced by Sumitomo Chemical Co., Ltd.

[Inorganic Filler (C)]

The inorganic filler (C) to be used for the olefin resin composition of the present invention is an inorganic filler being powdery, flaky, granular in shape or an inorganic filler being fibrous in shape.

Specific examples of the inorganic fillers being powdery, flaky or granular in shape include talc, mica, calcium carbonate, barium sulfate, magnesium carbonate, clay, alumina, silica, calcium sulfate, quartz sand, carbon black, titanium oxide, magnesium hydroxide, zeolite, molybdenum, diatomaceous earth, sericite, SHIRASU (light gray volcanic ash), calcium hydroxide, calcium sulfite, sodium sulfate, bentonite, and graphite.

Specific examples of the inorganic fillers fibrous in shape include fibrous magnesium oxysulfate, fibrous potassium titanate, fibrous magnesium hydroxide, fibrous aluminum borate, fibrous calcium silicate, fibrous calcium carbonate, carbon fiber, glass fiber, and metal fiber.

These may be used either singly or, in combination. Preferred among these is talc or fibrous magnesium oxysulfate.

The inorganic filler (C) may be used without having been treated. In order to increase interface adhesiveness with the propylene resin composition (A) and to increase dispersibility in the propylene resin composition (A), the inorganic filler (C) may be used with its surface having been treated with a coupling agent or a surfactant. Examples of the coupling agent include a silane coupling agent and a titanium coupling agent. Examples of the surfactant include higher fatty acids, higher fatty acid esters, higher fatty acid amides, and higher fatty acid salts.

The average particle diameter of the inorganic filler being powdery, flaky or granular in shape is preferably 10 μm or less, and preferably is 5 μm or less. The "average particle diameter" in the present invention means a 50% equivalent particle diameter D50 that is determined from an integral distribution curve of the sub-sieve method produced through measurement conducted with particles being suspended in a dispersing medium, such as water and alcohol, by means of a centrifugal sedimentation type particle size distribution analyzer.

In the case of an inorganic filler being fibrous in shape, its average fiber length measured by electron microscope observation is preferably 3 μm or more, more preferably 3 to 20 μm, and even more preferably 7 to 15 μm. The average fiber diameter measured by electron microscopic observation is preferably 0.2 to 1.5 μm, and more preferably is 0.3 to 1.0 μm. The aspect ratio is preferably 10 or more, more preferably 10 to 30, and even more preferably 12 to 25. The aspect ratio of an inorganic filler being fibrous in shape is the ratio of its average fiber length to its average fiber diameter (average fiber length/average fiber diameter).

The content of the ethylene-α-olefin copolymer (B) contained in the olefin resin composition of the present invention is 5 to 75 parts by weight, preferably 5 to 50 parts by weight, and more preferably 5 to 25 parts by weight relative to 100 parts by weight of the propylene resin composition (A).

The content of the inorganic filler (C) is 1 to 75 parts by weight, preferably from 1 to 65 parts by weight, and more preferably 1 to 25 parts by weight relative to 100 parts by weight of the propylene resin composition (A).

The olefin resin composition of the present invention is produced by melt-kneading the propylene resin composition (A), the ethylene-α-olefin copolymer (B) and the inorganic filler (C).

The melt-kneading temperature is preferably 180° C. or more, more preferably 180 to 300° C., and even more preferably 180 to 250° C.

Examples of the kneading machine to be used for the melt-kneading include a Banbury mixer, a single screw extruder, and a co-rotating twin screw extruder.

The olefin resin composition of the present invention may have a shape like a strand, a sheet or a flat plate or a shape like a pellet obtained by cutting a strand into an appropriate length.

A pellet-shaped resin composition having a length of 1 to 50 mm is preferred in terms of stable production of a molded article in producing a molded article by molding the olefin resin composition of the present invention.

The olefin resin composition of the present invention may contain an additive. Examples of the additive include a neutralizer, an antioxidant, a UV absorber, a light fastness agent, a weather resistance agent, a lubricant, an antistatic agent, an antiblocking agent, a processing aid, a coloring agent, a foaming agent, a foam nucleating agent, a plasticizer, a flame retardant, a crosslinking agent, a crosslinking a a brightening agent, an antibacterial agent, and a light diffusing agent. Such additives may be used singly or in combination.

The olefin resin composition of the present invention is used for a molded article. Examples of the molded article include an injection molded article, a hollow molded article, a sheet, a film, and a foam molded article. Examples of the method for molding the olefin resin composition of the present invention into said molded article include an injection molding method, a blow molding method, a sheet forming method, a lamination molding method, and a foam molding method.

In order to inhibit punctiform protrusions or indentations from generating on the surface of a molded article made of the olefin resin composition of the present invention, it is preferred to pass the propylene resin composition (A), the ethylene-α-olefin copolymer (B) and the inorganic filler (C) through a filter after melt-kneading them. The filter may have either a single stage or a multiple stages. A molded article made of an olefin resin composition produced by melt-kneading and subsequently passing through a filter has good impact resistance or good appearance because the molded article has only a few protrusions or indentations generated on the surface thereof.

EXAMPLES

The present invention is descried with reference to Examples and Comparative Examples below. The component polymers of the propylene resin composition (A), the ethylene-α-olefin copolymers (B), and the inorganic fillers (C) used in Examples and Comparative Examples are given below.

(1) Component Polymers of Propylene Resin Composition (A)
(A-1) Propylene Homopolymer
Intrinsic viscosity ([η]): 7.1 dl/g
Melting peak temperature (Tm): 164° C.
(A-2) Propylene Homopolymer
Intrinsic viscosity ([η]): 0.86 dl/g
(A-3) Propylene Homopolymer
Intrinsic viscosity ([η]): 0.92 dl/g
(A-4) Propylene Homopolymeric Material
A polymeric material composed of a propylene homopolymer (A-4-a1) and a propylene homopolymer (A-4-a2) was used.

The propylene homopolymer (A-4-a1) was produced in the first step by using a polymerization catalyst obtained by the method of Example 1 of JP-A-2004-182981 and then the propylene homopolymer (A-4-a2) was produced continuously in the second step. In each of the first step and the second step, a liquid phase polymerization reaction using liquid propylene was carried out. The jacket temperature was controlled so that the polymerization temperature in the system might be constant, and hydrogen in the system as kept at a constant concentration by feeding hydrogen and liquid propylene constantly. The intrinsic viscosity ([η]Total) of the propylene homopolymeric material (A-4) finally obtained was 1.10 dl/g. The results of the analysis of the resulting homopolymeric material (A-4) are shown below.

Intrinsic viscosity ([η]A-4) of polymeric material: 1.10 dl/g
 Polymer (A-4-a1): propylene homopolymer
 Content of polymer (A-4-a1): 3.8% by weight
 Intrinsic viscosity ([η]A-4-a1) of polymer (A-4-a1): 7.1 dl/g
 Melting peak temperature (Tm) of polymer (A-4-a1): 164° C.
 Polymer (A-4-a2): propylene homopolymer
 Content of polymer (A-4-a2): 96.2% by weight
 Intrinsic viscosity ([η]A-4-a2) of polymer (A-4-a2): 0.86 dl/g (A-5) Propylene Copolymeric Material A polymeric material, composed of a propylene-ethylene random copolymer (A-5-a1) and a propylene homopolymer (A-5-a2) was used.

The propylene-ethylene random copolymer (A-5-a1) was produced in the first step by using a polymerization catalyst obtained by the method of Example 1 of JP-A-2004-182981 and then the propylene homopolymer (A-5-a2) was produced continuously in the second step. In the first step, a liquid phase polymerization reaction using liquid propylene was carried out in the presence of ethylene. The jacket temperature was controlled so that the polymerization temperature in the system might be constant, and hydrogen and ethylene in the system were kept at constant concentrations by feeding hydrogen and ethylene constantly. On the other hand, in the second step was carried out a gas phase polymerization reaction using liquid propylene. Propylene was fed continuously so that the reaction temperature and the reaction pressure might be kept constant, and the production of the propylene homopolymer by gas phase polymerization was continued while feeding hydrogen so that the hydrogen concentration in the gas phase might be kept constant. The intrinsic viscosity ([η]Total) of the propylene copolymeric material (A-5) finally obtained was 5.87 dl/g. The results of the analysis of the resulting copolymeric material (A-5) are shown below.

Intrinsic viscosity ([η]A-5) of polymeric material: 5.87 dl/g
 Polymer (A-5-a1): propylene-ethylene random copolymer
 Content of polymer (A-5-a1): 72.0% by weight
 Ethylene content of polymer (A-5-a1): 2.8% by weight
 Intrinsic viscosity ([η]A-5-a1) of polymer (A-5-a1): 7.8 dl/g
 Melting peak temperature (Tm) of polymer (A-5-a1): 148° C.
 Polymer (A-5-a2): propylene homopolymer
 Content of polymer (A-5-2): 28.0% by weight
 Intrinsic viscosity ([η]A-5-a2) of polymer (A-5-a2): 0.90 dl/g (A-6) Propylene Copolymeric Material A polymeric material composed of a propylene homopolymer (A-6-a1) and a propylene-ethylene random copolymer (A-6-a3) was used.

The propylene homopolymer (A-6-a1) was produced in the first step by using a polymerization catalyst obtained by the method of Example 1 of JP-A-2004-182981 and then the propylene-ethylene random copolymer (A-6-a3) was produced continuously in the second step. In the first step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand, in the second step was carried out a gas phase polymerization reaction. Propylene was fed continuously so that the reaction temperature and the reaction pressure might be, kept constant, and the production of the propylene ethylene random copolymer by gas phase polymerization was continued while feeding hydrogen and ethylene so that the hydrogen concentration in the gas phase and the ethylene concentration in the gas phase might be kept constant. The intrinsic viscosity ([η]Total) of the propylene copolymeric material (A-6) finally obtained was 1.46 dl/g. The results of the analysis of the resulting copolymeric material (A-6) are shown below.

Intrinsic viscosity ([η]A-6) of polymeric material: 1.46 dl/g
 Polymer (A-6-a1): propylene homopolymer
 Content of polymer (A-6-a1): 69.6% by weight
 Intrinsic viscosity ([η]A-6-a1) of polymer (A-6-a1): 0.86 dl/g
 Polymer (A-6-a3): propylene-ethylene random copolymer
 Content of polymer (A-6-a3): 30.4% by weight
 Ethylene content of polymer (A-6-a3): 30% by weight
 Intrinsic viscosity ([η]A-6-a3) of polymer (A-6-a3): 2.8 dl/g (A-7) Propylene Copolymeric Material A polymeric material composed of a propylene homopolymer (A-7-a1), a propylene-ethylene random copolymer (A-7-a3), and a propylene-ethylene random copolymer (A-7-a4) was used.

The propylene homopolymer (A-7-a1) was produced in the first step by using a polymerization catalyst obtained by the method of Example 1 of JP-A-2004-182981, then the propylene-ethylene random copolymer (A-7-a3) was produced in the second step, and then the propylene-ethylene random copolymer (A-7-a4) was produced continuously in the third step. In the first step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand in each of the second step and the third step was carried out a gas phase polymerization reaction. Propylene as fed continuously so that the reaction temperature and the reaction pressure might be kept constant, and the production of the propylene-ethylene random copolymer by gas phase polymerization was continued while feeding hydrogen and ethylene so that the hydrogen concentration in the gas phase and the ethylene concentration in the gas phase might be kept constant. The intrinsic viscosity ([η]Total) of the propylene copolymeric material (A-7) finally obtained was 2.12 dl/g. The results of the analysis of the resulting copolymeric material (A-7) are shown below.

Ethylene content of polymeric material: 15.5% by weight
Intrinsic viscosity ([η]A-7) of polymeric material: 2.12 dl/g
  Polymer (A-7-a1): propylene homopolymer
  Content of polymer (A-7-a1): 56.6% by weight
  Intrinsic viscosity ([η]A-7-a1) of polymer (A-7-a1): 0.86 dl/g
  Polymer (A-7-a3): propylene-ethylene random copolymer
  Content of polymer (A-7-a3): 27.0% by weight
  Ethylene content of polymer (A-7-a3): 30% by weight
  Intrinsic viscosity ([η]A-7-a3) of polymer (A-7-a3): 2.9 dl/g
  Polymer (A-7-a4): propylene-ethylene random copolymer
  Content of polymer (A-7-a4): 16.4% by weight
  Ethylene content of polymer (A-7-a4): 45% by weight
  Intrinsic viscosity ([η]A-7-a4) of polymer (A-7-4): 5.2 dl/g (A-8) Propylene Copolymeric Material A polymeric material composed of a propylene homopolymer (A-8-a1), propylene homopolymer (A-8-a2), a propylene-ethylene random copolymer (A-8-a3), and a propylene-ethylene random copolymer (A-8-a4) was used.

The propylene homopolymer (A-8-a1) was produced in the first step by using a polymerization catalyst obtained by the method of Example 1 of JP-A-2004-182981, then the propylene homopolymer (A-8-a2) was produced in the second step, then the propylene-ethylene random copolymer (A-8-a3) was produced in the third step, and then the propylene-ethylene random copolymer (A-8-a4) was produced continuously in the fourth step. In each of the first step and the second step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand, in each of the third step and the fourth step was carried out a gas phase polymerization reaction. Propylene was fed continuously so that the reaction temperature and the reaction pressure might be kept constant, and the production of the propylene-ethylene random copolymer by gas phase polymerization was continued while feeding hydrogen and ethylene so that the hydrogen concentration in the gas phase and the ethylene concentration in the gas phase might be kept constant. The intrinsic viscosity ([η] Total) of the propylene copolymeric material (A-8) finally obtained was 2.02 dl/g. The results of the analysis of the resulting copolymeric material (A-8) are shown below.

Intrinsic viscosity ([η]A-8) of polymeric material: 2.02 dl/g
  Polymer (A-8-a1): propylene homopolymer
  Content of polymer (A-8-a1): 2.6% by weight
  Intrinsic viscosity ([η]A-8-a1) of polymer (A-8-a1): 7.2 dl/g
  Melting peak temperature (Tm) of polymer (A-8-a1): 164° C.
  Polymer (A-8-a2): propylene homopolymer
  Content of polymer (A-8-a2): 63.0% by weight
  Intrinsic viscosity ([η]A-8-a2) of polymer (A-8-a2): 0.86 dl/g
  Polymer (A-8-a3): propylene-ethylene random copolymer
  Content of polymer (A-8-a3): 22.4% by weight
  Ethylene content of polymer (A-8-a3): 30% by weight
  Intrinsic viscosity ([η]A-8-a3) of polymer (A-8-a3): 2.8 dl/g
  Polymer (A-8-a4): propylene-ethylene random copolymer
  Content of polymer (A-8-a4): 12.0% by weight
  Ethylene content of polymer (A-8-a4): 44% by weight
  Intrinsic viscosity ([η]A-8-a4) of polymer (A-8-a4): 5.7 dl/g (A-9) Propylene Copolymeric Material A polymeric material composed of a propylene homopolymer (A-9-a1), a propylene homopolymer (A-9-a2), and a propylene-ethylene random copolymer (A-9-a3) was used.

The propylene homopolymer (A-9-a1) was produced in the first step by using a polymerization catalyst obtained by the method of Example 1 of JP-A-2004.182981, then the propylene homopolymer (A-9-a2) was produced in the second step, and then the propylene-ethylene random copolymer (A-9-a3) was produced continuously in the third step. In each of the first step and the second step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand, in the third step was carried out a gas phase polymerization reaction. Propylene was fed continuously so that the reaction temperature and the reaction pressure might be kept constant, and the production of the propylene-ethylene random copolymer by gas phase polymerization was continued while feeding hydrogen and ethylene so that the hydrogen concentration in the gas phase and the ethylene concentration in the gas phase might be kept constant. The intrinsic viscosity ([η] Total) of the propylene copolymeric material (A-9) finally obtained was 1.53 dl/g. The results of the analysis of the resulting copolymeric material (A-9) are shown below.

Intrinsic viscosity ([η]A-9) of polymeric material: 1.53 dl/g
  Polymer (A-9-a1): propylene homopolymer
  Content of polymer (A-9-a1): 2.9% by weight
  Intrinsic viscosity ([η]A-9-a1) of polymer (A-9-a1): 7.2 dl/g
  Melting peak temperature (Tm) of polymer (A-9-a1): 164° C.
  Polymer (A-9-a2): propylene homopolymer
  Content of polymer (A-9-a2): 71.7% by weight
  Intrinsic viscosity ([η]A-9-a2) of polymer (A-9-a2): 0.86 dl/g
  Polymer (A-9-a3): propylene-ethylene random copolymer
  Content of polymer (A-9-a3): 25.4% by weight
  Ethylene content of polymer (A-9-a3): 30% by weight
  Intrinsic viscosity ([η]A-9-a3) of polymer (A-9-a3): 2.8 dl/g (A-10) Propylene Copolymeric Material A polymeric material composed of a propylene homopolymer (A-10-a1), a propylene homopolymer (A-10-a2), a propylene-ethylene random copolymer (A-10-a3), and a propylene-ethylene random copolymer (A-10-a4) was used.

The propylene homopolymer (A-10-a1) was produced in the first step by using a polymerization catalyst obtained by the method of Example 1 of JP-A-2004-182981, then the propylene homopolymer (A-10-a2) was produced in the second step, then the propylene-ethylene random copolymer (A-10-a3) was produced in the third step, and then the propylene-ethylene random copolymer (A-10-a4) was produced continuously in the fourth step. In each of the first step and the second step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand, in each of the third step and the fourth step was carried out a gas phase polymerization reaction. Propylene was fed continuously so that the reaction temperature and the reaction pressure might be kept constant, and the production of the propylene-ethylene random copolymer by gas phase polymerization was continued while feeding hydrogen and ethylene so that the hydrogen concentration in the gas phase and the ethylene concentration in the gas phase might be kept constant. The intrinsic viscosity ([η]Total) of the propylene copolymeric material (A-10) finally obtained was 2.05 dl/g. The results of the analysis of the resulting copolymeric material (A-10) are shown below.

Intrinsic viscosity ([η]A-10) of polymeric material: 2.05 dl/g

Polymer (A-10-a1): propylene homopolymer

Content of polymer (A-10-a1): 2.5% by weight

Intrinsic viscosity ([η]A-10-a1) of polymer (A-10-a1): 7.2 dl/g

Melting peak temperature (Tm) of polymer (A-10-a1): 164° C.

Polymer (A-10-a2): propylene homopolymer

Content of polymer (A-10-a2): 58.9% by weight

Intrinsic viscosity ([η]A-10-a2) of polymer (A-10-a2): 0.86 dl/g

Polymer (A-10-a3): propylene-ethylene random copolymer

Content of polymer (A-10-a3): 21.0% by weight

Ethylene content of polymer (A-10-a3): 49% by weight

Intrinsic viscosity ([η]A-10-a3) of polymer (A-10-a3): 2.8 dl/g

Polymer (A-10-a4): propylene-ethylene random copolymer

Content of polymer (A-10-a4): 17.6% by weight

Ethylene content of polymer (A-10-a4): 31% by weight

Intrinsic viscosity ([η]A-10-a4) of polymer (A-10-a4): 4.5 dl/g (A-11) Propylene Copolymeric Material A polymeric material composed of a propylene homopolymer (A-11-a1), a propylene homopolymer (A-11-a2), and a propylene-ethylene random copolymer (A-11-a3) was used.

The propylene homopolymer (A-11-a1) was produced in the first step by using a polymerization catalyst obtained by the method of Example 1 of JP-A-2004-182981, then the propylene homopolymer (A-11-a2) was produced in the second step, and then the propylene-ethylene random copolymer (A-11-a3) was produced continuously in the third step. In each of the first step and the second step, a liquid phase polymerization reaction using liquid propylene was carried out. The jacket temperature was controlled so that the polymerization temperature in the system might be constant, and hydrogen in the system was kept at a constant concentration by feeding hydrogen and liquid propylene constantly. On the other hand, in each of the third step and the fourth step was carried out a gas phase polymerization reaction. Propylene was fed continuously so that the reaction temperature and the reaction pressure might be kept constant, and the production of the propylene-ethylene random copolymer by gas phase polymerization was continued while feeding hydrogen and ethylene so that the hydrogen concentration in the gas phase and the ethylene concentration in the gas phase might be kept constant. The intrinsic viscosity ([η]Total) of the propylene copolymeric material (A-11) finally obtained was 1.52 dl/g. The results of the analysis of the resulting copolymeric material (A-11) are shown below.

Intrinsic viscosity ([η]A-11) of polymeric material: 1.52 dl/g

Polymer (A-11-a1): propylene homopolymer

Content of polymer (A-11-a1): 2.9% by weight

Intrinsic viscosity ([η]A-11-a1) of polymer (A-11-a1): 7.2 dl/g

Melting peak temperature (Tm) of polymer (A-11-a1): 164° C.

Polymer (A-11-a2): propylene homopolymer

Content of polymer (A-11-a2): 71.6% by weight

Intrinsic viscosity ([η]A-11-a2) of polymer (A-11-a2): 0.86 dl/g

Polymer (A-11-a3): propylene-ethylene random copolymer

Content of polymer (A-11-a3): 25.5% by weight

Ethylene content of polymer (A-11-a3): 49% by weight

Intrinsic viscosity ([η]A-1'-a3) of polymer (A-11-a3): 2.8 dl/g (2) Ethylene-Octene Random Copolymer (β)

Commercial name: ENGAGE 8200 (produced by Dow Chemical Japan Limited)

Density: 0.870 (g/cm$^3$)

Melt flow rate (MFR, measured at 190° C., 2.16 kg-load): 5 g/10 minutes (3) Inorganic Filler (C)

Talc

Commercial name: JR-46 (produced by Hayashi Kasei Co., Ltd.)

Average particle diameter: 2.7 μm

The physical properties of the polymers used as raw materials and resin compositions were measured in accordance with the methods shown below.

(1) Melt Flow Rate (MFR; Unit: g/10 min.)

Melt flow rate was measured by the method provided in JIS K7210.

Component polymers of propylene resin composition (A): MFR was measured at a temperature of 230° C. and a load of 2.16 kgf.

Ethylene-α-olefin copolymer (B): MFR was measured at a temperature of 190° C. and a load of 2.16 kgf.

Resin composition: MFR was measured at a temperature of 230° C. and a load of 2.16 kgf.

(2) Intrinsic Viscosity ([η], Unit: Dl/g)

The intrinsic viscosity of a polymer used as a raw material was measured in the following procedures. First, reduced viscosities were measured at three concentrations of 0.1, 0.2 and 0.5 g/dl by using a Ubbelohde's viscometer. The intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), specifically, by an extrapolation method in which reduced viscosities are plotted against concentrations and the concentration is extrapolated in zero. The measurement was carried out in tetralin of 135° C.

(3) Melting Peak Temperature (Tm, Unit: ° C.)

Measurement was carried out with a differential scanning calorimeter (DSC-7 manufactured by PerkinElmer Inc.). Specifically, a polymer was held at 220° C. for 5 minutes, cooled to 150° C. at a temperature ramp-down rate of 300° C./min, and then held at 150° C. for one minute. Subsequently, the polymer was cooled to 50° C. at a temperature ramp-down rate of 5° C./min, held at 50° C. for one minute, and then heated from 50° C. to 180° C. at a temperature ramp-up rate of 5° C./min. In a resulting endothermic curve, the temperature of the peak largest in endotherm was determined as a melting peak temperature (Tm).

(4) Flexural Modulus (FM, Unit: MPa)

Injection molding was carried out at a molding temperature of 220° C. and a mold temperature of 50° C. by using an injection molding machine IS220EN manufactured by Toshiba Machine Co., Ltd., affording a specimen (6.4 mm in thickness) for physical property evaluation. Using this specimen, measurement was carried out in accordance with the method specified in JIS K7203. The span length was 100 mm, the loading speed was 2.0 mm/min, and the measurement temperature was 23° C.

(5) Scratch Resistance

Molding was carried out at a molding temperature of 220° C. by using an injection molding machine SE180D (clamping force: 180 tons) manufactured by Sumitomo Heavy Industries, Ltd. and a mold sized 100 mm×400 mm×3.0 mm, yielding a grain-patterned flat molded article. A 100 mm square sample was cut out from the resulting flat molded article, and it was used as a sample to be measured. A scratch resistance test was carried out under the following conditions.
Instrument used: a Taber scratch tester manufactured by Toyo Seiki Seisaku-sho, Ltd.
Rotation speed: 0.5 rpm
Cutter: tungsten carbide,
   4.8 mm square, 19 mm long, and 12.7 mm in blade tip radius
Direction of cutter: the cutter was mounted with its longer face up.
Load: 100 g Scratch resistance was evaluated by observing visually. Rating criteria are as follows.
◯: Scratches, whitening, or damage on a gain pattern is not observed, or is observed but is not conspicuous.
x: Scratches, whitening, or damage on a grain pattern is observed and is conspicuous.

(6) Gloss (Unit: %)

Based on the method specified in JIS K7105, the 60° specular glossiness of a molded article was measured.

(7) Flow Mark Generation Position (Unit: Mm)

Molding was carried out at a molding temperature of 220° C. by using an injection molding machine SE180D (clamping force: 180 tons) manufactured by Sumitomo Heavy Industries, Ltd. and an injection mold (with a single gate) having a cavity sized 100 mm×400 mm×3.0 mm, yielding a mirrored flat molded article. A flow mark was observed visually using a resulting flat molded article. The distance (unit: mm) from the gate end surface of the position where a flow mark had started to occur was observed. In this case, the fact that the flow mark generation position is farther means that the appearance is better.

(8) The Number of Protrusions or Indentations (Unit: /10 $Cm^2$)

A film processed with a T-die extruder under the following conditions was quantitatively analyzed according to the following method by using an image analyzing device.
(Film Processing Conditions)

A film 50 mm in width and 50 μm in thickness was prepared by using an extruder V-20 manufactured by Tanabe Plastics Machinery Co., Ltd. and a film take-off device.
(Quantitative Analytical Method)

An image (900 dpi, 8 bits) of a film was captured on a computer by using a scanner GT-9600 manufactured by SEIKO EPSON CORPORATION and the image was binarized using image analysis software "A-zo kun" produced by Asahi Engineering. Co., Ltd. A protrusion or an indentation was recognized as a portion brighter than its surrounding. Since a protrusion or an indentation is irregular in shape, the number of protrusions or indentations having a diameter of 100 μm or more per 10 $cm^2$ of film was determined with the assumption that the diameter of a circle whose area is equal to the area of a protrusion or an indentation is the size of the protrusion or the indentation.

Examples 1 to 3, Comparative Examples 1 to 3

The blended percentages of polymers (A-1) to (A-11) are shown in the following Table 1, where the total amount of polymers (A-1) to (A-11) is taken as 100% by weight. The loadings of the ethylene-α-olefin copolymer (β) and the inorganic filler (C) relative to 100 parts by weight of the total amount of polymers (A-1) to (A-11) are shown in the following Table 1.

Polymers (A-1) to (A-11) in the blended percentages given in Table 1 and the ethylene-α-olefin copolymer (B) and the inorganic filler (C) in the loadings given in Table 1 were kneaded and extruded under suction by using a twin screw kneading extruder, thereby producing an olefin resin composition. Physical properties and so on of the resulting olefin resin compositions are shown in the following Tables 2 and 3.

TABLE 1

| | (A) | | | | | | | | | | | (B) | (C) |
|---|---|---|---|---|---|---|---|---|---|---|---|---|---|
| | (A-1) % by weight | (A-2) % by weight | (A-3) % by weight | (A-4) % by weight | (A-5) % by weight | (A-6) % by weight | (A-7) % by weight | (A-8) % by weight | (A-9) % by weight | (A-10) % by weight | (A-11) % by weight | parts by weight | parts by weight |
| Example 1 | | 0.7 | 23.6 | | | | | 71.6 | 4.1 | | | 6.8 | 28.4 |
| Example 2 | 3.0 | 34.9 | | | 18.9 | 43.2 | | | | | | 6.8 | 28.4 |
| Example 3 | 3.0 | 34.9 | | | 9.5 | 52.7 | | | | | | 6.8 | 28.4 |
| Comparative Example 1 | | | 24.3 | | | | | | | 48.7 | 27.0 | 6.8 | 28.4 |
| Comparative Example 2 | | 37.8 | | | 9.5 | 52.7 | | | | | | 6.8 | 28.4 |
| Comparative Example 3 | | 33.6 | | 4.2 | 9.5 | 52.7 | | | | | | 6.8 | 28.4 |

TABLE 2

| | (a1) | | | (a2) | | (a3) Ethylene | | | (a4) Ethylene | | |
|---|---|---|---|---|---|---|---|---|---|---|---|
| | $[\eta]_{a1}$ dl/g | % by weight | Tm ° C. | $[\eta]_{a2}$ dl/g | % by weight | $[\eta]_{a3}$ dl/g | % by weight | % by weight | $[\eta]_{a4}$ dl/g | % by weight | % by weight |
| Example 1 | 7.2 | 2.8 | 164 | 0.87 | 71.5 | 2.8 | 30 | 17.1 | 5.7 | 44 | 8.6 |
| Example 2 | 7.1 | 3.0 | 164 | 0.89 | 72.5 | 2.9 | 30 | 17.4 | 5.2 | 45 | 7.1 |

TABLE 2-continued

|  | (a1) | | | (a2) | | (a3) Ethylene | | | (a4) Ethylene | | |
| --- | --- | --- | --- | --- | --- | --- | --- | --- | --- | --- | --- |
|  | $[\eta]_{a1}$ dl/g | % by weight | Tm °C. | $[\eta]_{a2}$ dl/g | % by weight | $[\eta]_{a3}$ dl/g | % by weight | % by weight | $[\eta]_{a4}$ dl/g | % by weight | % by weight |
| Example 3 | 7.1 | 3.0 | 164 | 0.89 | 71.4 | 2.9 | 30 | 17.0 | 5.2 | 45 | 8.6 |
| Comparative Example 1 | 7.2 | 2.9 | 164 | 0.87 | 71.4 | 2.8 | 49 | 17.1 | 4.5 | 31 | 8.6 |
| Comparative Example 2 | — | 0 | — | 0.86 | 74.2 | 2.9 | 30 | 17.1 | 5.2 | 45 | 8.7 |
| Comparative Example 3 | 7.8 | 3.0 | 148 | 0.89 | 71.2 | 2.9 | 30 | 17.1 | 5.2 | 45 | 8.7 |

TABLE 3

|  | Flexural modulus MPa | Scratch resistance | Gloss % | Flow mark generation position mm | Number of protrusions or indentations/ 10 cm² |
| --- | --- | --- | --- | --- | --- |
| Example 1 | 2065 | ○ | 41.3 | 242 | 1 |
| Example 2 | 2009 | ○ | no data | no data | no data |
| Example 3 | 2006 | ○ | 42.1 | 232 | 63 |
| Comparative Example 1 | 2137 | x | 48.6 | 264 | 0 |
| Comparative Example 2 | 1936 | x | 39.4 | 136 | 1 |
| Comparative Example 3 | 1948 | x | no data | no data | no data |

What is claimed is:

1. A propylene resin composition (A) composed of 0.5 to 10% by weight of a propylene homopolymer (a1) defined below, 40 to 98% by weight of a propylene polymer (a2) defined below, 1 to 25% by weight of a propylene-ethylene random copolymer (a3) defined below, and 0.5 to 25% by weight of a propylene-ethylene random copolymer (a4) defined below, where the total amount of (a1), (a2), (a3) and (a4) is taken as 100% by weight, propylene homopolymer (a1):
a propylene homopolymer whose intrinsic viscosity $[\eta]_{a1}$ is 5 dl/g or more and whose melting peak temperature exhibited in a melting curve measured by using a differential scanning calorimeter is a temperature higher than 160° C., propylene polymer (a2):
a propylene homopolymer whose intrinsic viscosity $[\eta]_{a2}$ is less than 5 dl/g, or a propylene random copolymer which is composed of constitutional units derived from at least one comonomer selected from the group consisting of ethylene and α-olefins having 4 to 10 carbon atoms and constitutional units derived from propylene, wherein the content of the constitutional units derived from at least one comonomer selected from the group consisting of ethylene and α-olefins having 4 to 10 carbon atoms is not less than 0.01% by weight but less than 20% by weight where the overall weight of the propylene polymer (a2) is taken as 100% by weight, and the intrinsic viscosity $[\eta]_{a2}$ of which is less than 5 dl/g, propylene-ethylene random copolymer (a3):
a propylene-ethylene random copolymer whose intrinsic viscosity $[\eta]_{a3}$ is 2 to 5 dl/g and whose content of constitutional units derived from ethylene is 25 to 35% by weight where the weight of the entire propylene-ethylene random copolymer (a3) is taken as 100% by weight, propylene-ethylene random copolymer (a4):
a propylene-ethylene random copolymer whose intrinsic viscosity $[\eta]_{a4}$ is more than 5 dl/g but not more than 8 dl/g and whose content of constitutional units derived from ethylene is 40 to 90% by weight where the weight of the entire propylene-ethylene random copolymer (a4) is taken as 100% by weight.

2. An olefin resin composition comprising 100 parts by weight of the propylene resin composition (A), 5 to 75 parts by weight of an ethylene-α-olefin copolymer (B), and 1 to 75 parts by weight of an inorganic filler (C).

* * * * *